United States Patent [19]

McAllister

[11] Patent Number: 5,244,572
[45] Date of Patent: Sep. 14, 1993

[54] ROTARY DRUM FILTER WITH IMPROVED DECK STRUCTURE

[75] Inventor: Robert L. McAllister, Vancouver, Wash.

[73] Assignee: LaValley Industries, Inc., Vancouver, Wash.

[21] Appl. No.: 802,746

[22] Filed: Dec. 6, 1991

[51] Int. Cl.⁵ .......................................... B01D 33/067
[52] U.S. Cl. ...................................... 210/402; 210/404; 210/406; 209/270
[58] Field of Search ....................... 210/402, 404, 406; 209/270; 162/251, 357

[56] References Cited

U.S. PATENT DOCUMENTS

| | | | |
|---|---|---|---|
| 2,204,928 | 6/1940 | Culver | 210/404 |
| 2,991,218 | 7/1961 | Cirrito | 162/357 |
| 2,998,883 | 9/1961 | Rich | 210/404 |
| 3,306,457 | 2/1967 | Putnam | 210/330 |
| 3,323,654 | 6/1967 | Lee | 210/404 |
| 3,363,774 | 1/1968 | Luthi | 210/404 |
| 3,409,139 | 11/1968 | Jackson | 210/404 |
| 3,419,150 | 12/1968 | Davis | 210/404 |
| 3,590,453 | 7/1971 | Bryand | 162/357 |
| 3,680,708 | 8/1972 | Luthi | 210/404 |
| 3,695,996 | 10/1972 | Frezzotti | 162/357 |
| 3,794,178 | 2/1974 | Luthi | 210/404 |
| 3,837,499 | 9/1974 | Luthi | 210/404 |
| 3,894,899 | 7/1975 | Konopatov | 210/402 |
| 4,001,119 | 1/1977 | Hunter | 210/404 |
| 4,101,374 | 7/1978 | Nebel | 162/357 |
| 4,154,687 | 5/1979 | LaValley | 210/392 |
| 4,266,413 | 5/1981 | Yli-Vakkuri | 210/404 |
| 4,289,624 | 9/1981 | Golczewzki | 210/404 |
| 4,370,231 | 1/1983 | LaValley | 210/404 |
| 4,383,877 | 5/1983 | LaValley | 210/404 |
| 4,407,720 | 10/1983 | Bratten | 210/404 |
| 4,419,165 | 12/1983 | LaValley | 210/404 |

Primary Examiner—Thomas M. Lithgow
Attorney, Agent, or Firm—Marger, Johnson, McCollom & Stolowitz

[57] ABSTRACT

A drum filter is provided including a rotatably mounted, generally cylindrical drum with a filter and vacuum drainage associated therewith. The deck structure comprises a plurality of circumferentially spaced, axially extending, and radially projecting imperforate members affixed at one end to the outer peripheral surface of the drum and having an outer end on which said filter is supported. The members each include a pair of circumferentially spaced, axially extending, and radially projecting imperforate surfaces. Perforate members are preferably formed in a substantially "U" shaped cross-sectional configuration comprising a pair of sidewall members connected to a floor member, which in turn is joined to and supported on the outer peripheral surface of the filter drum. The opposed surfaces of the members together define filtrate slots which form open axially extending channels adapted to receive at least a substantial portion of the filtrate after the drum rotates past the twelve o'clock position. In this way, rewetting of a fibrous mat formed on the filter is minimized. The ratio of the radially projecting height of the of the imperforate channel to the width in the circumferential direction between opposed surfaces of adjacent members is at least about 1.25:1

9 Claims, 2 Drawing Sheets

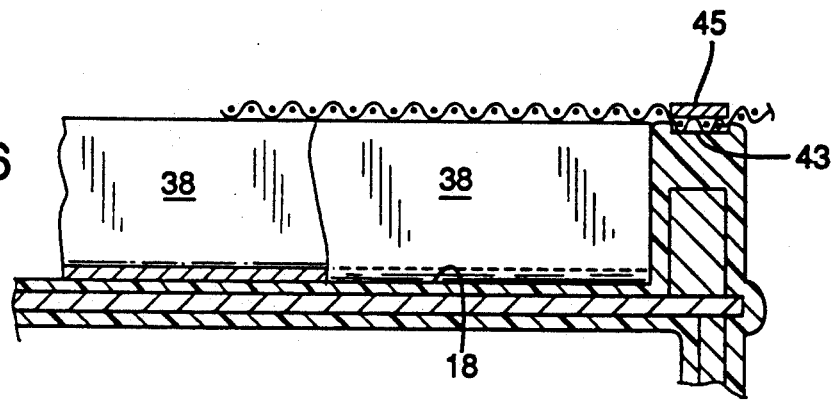
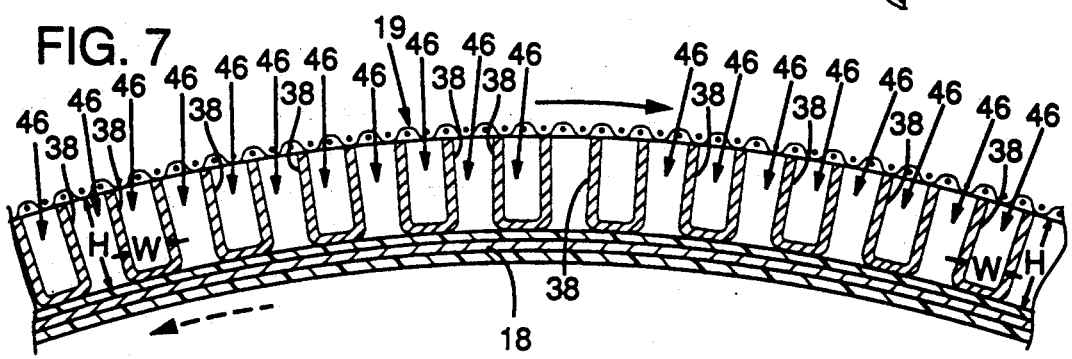
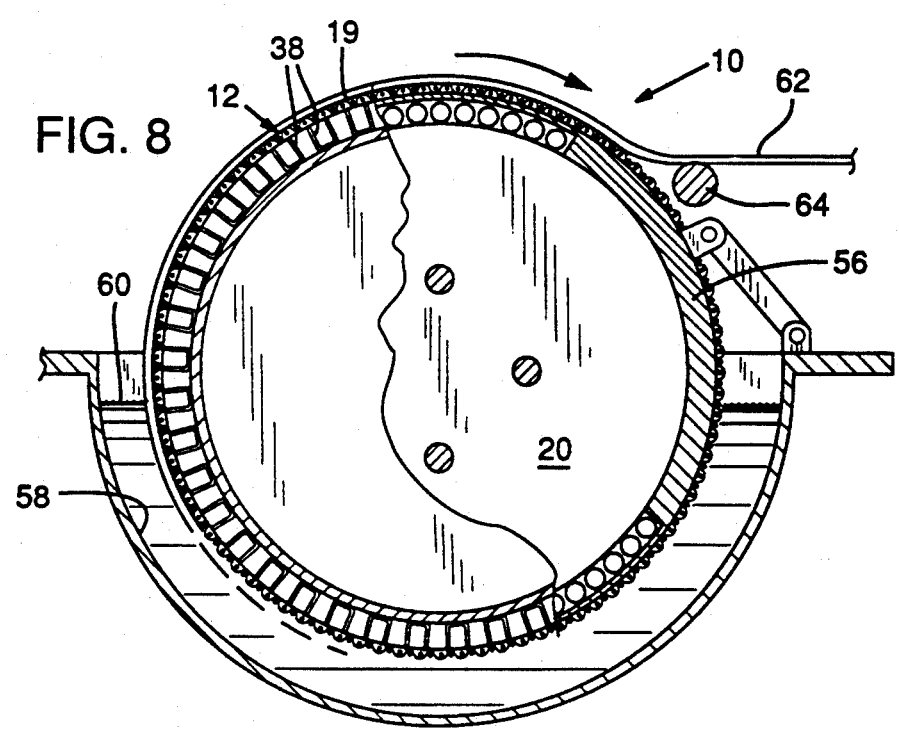

ROTARY DRUM FILTER WITH IMPROVED DECK STRUCTURE

BACKGROUND OF THE INVENTION

1. Field of the Invention

The present invention relates generally to rotary drum filters, and more particularly to an improved deck structure for such a filter.

2. Description of the Prior Art

Rotary drum filters are commonly used in the pulp and paper-making industry to separate wood pulp from its filtrate (see for example FIGS. 5 & 6). Such filters include a rotary drum partially submerged in a tank of pulp slurry. The drum has axially extending filtrate channels or compartments spaced about its periphery with such compartments being covered by a filter screen. The drum filter may be of the center valve type or the pipe machine type. With a center valve type filter each filtrate compartment opens into a center circumferential channel which communicates with a source of subatmospheric pressure. An arcuate, stationary valve member is mounted within and extends partially about the channel. As the drum rotates about its axis with subatmospheric pressure applied, the screen rotates through the pulp slurry, collecting a wet mat of fibers from the slurry. As the screen emerges from the tank, filtrate is drawn through the screen and compartments into the center channel, and from there is discharged through suitable piping, thereby removing the liquid from the mat. As the drum continues to rotate, the stationary valve member periodically blocks off the filtrate compartment outlets from the source of subatmospheric pressure, thus enabling removal of the pulp mat from the surface screen. A center valve type rotary drum filter is described in more detail in U.S. Pat. No. 4,154,687.

In a pipe machine type filter, the filtrate channels or compartments communicate through bucket sections, drainage conduits, and annular valve housing in communication with the source of the subatmospheric pressure. A stationary valve positioned within a valve seat portion of the valve housing controls the application of subatmospheric pressure to the respective valve chambers of the housing. As the drum rotates about its axis with subatmospheric pressure applied, the screen rotates through the pulp slurry and collects a wet mat of fibers from the slurry. As the screen emerges from the tank, filtrate is drawn through the screen and compartments into the bucket sections. From the bucket sections, the filtrate passes through drainage conduits and valve chambers, where it is discharged through suitable piping from the drum, and thus liquid is removed from the mat. As the drum continues its rotation, the stationary valve member periodically blocks off the filtrate compartments from the source of subatmospheric pressure, thereby enabling removal of the pulp mat from the surface screen. A conventional pipe machine type rotary drum filter is described in more detail in U.S. Pat. No. 3,363,774, and in U.S. Pat. No. 4,383,877 which is assigned to the assignee of the present application.

The described drum filters operate to lay a mat of wood pulp onto the surface of the drum as the pulp slurry is filtered through the screen. If desired, the pulp mat can be washed by directing showers at the mat prior to its removal from the drum.

One of the more important characteristics of drum filters is that they be able to rapidly remove water and other liquid from the passages adjacent the pulp mat. This is desirable because liquid being drawn through the mat has to pass through the covering screen into the filtrate compartments, where it is directed axially, under the pulp mat, for distances up to as much as 20 feet before being directed radially inward toward the center of the drum. Slow movement of this filtrate results in inefficient use of the subatmospheric pressure and is partially responsible for causing incomplete drainage of liquid from the pulp mat. This slow movement of filtrate, combined with the effects of gravity, also often causes rewetting of the pulp mat as a result of drainage from the filtrate compartments, back into the mat. This occurs primarily between the twelve and three o'clock positions (with a clockwise-rotating drum), and is most pronounced when the subatmospheric pressure is released for mat removal.

There are several drawbacks with incomplete drainage from the pulp mat. First, removal of liquid between the washing stages is incomplete, thereby decreasing the efficiency of the washing operations. Second, incomplete drainage often renders subsequent operations on the mat more difficult, for example, a greater quantity of chemicals, such as bleaches, caustic, etc., must be used in the next stages of treatment if a higher proportion of liquid remains in the mat as it leaves the drum. Third, incomplete drainage may result in the mat sticking to the drum at the mat discharge station, even though the vacuum has been released. This occurs because of the inability of sufficient air to pass through the relatively wet mat to relieve the vacuum beneath the mat. This sticking may very well result in tearing of the mat at the discharge station, since a heavy, liquid-loaded mat is often weaker that one which has been thoroughly drained.

Another drawback with many conventional designs is that after the drum surface passes the mat discharge station and prior to submergence in the slurry, liquid remaining in the filtrate compartments and the drainage conduits drains by gravity out through the filter screen, causing the compartments and conduits to be empty at resubmergence. This is undesirable because the air trapped in the conduits at resubmergence prevents the vacuum system from rapidly reapplying vacuum to the drum, thus interfering with accretion of the new mat on the drum. Trapped air in the filtrate compartments also interferes with the flow of filtrate through the drainage conduits during the formation of the mat.

In order to overcome the afore-described problems, attempts have been made to reduce the dimensions of the slots which open into the filtrate compartments. One such approach, exemplified in U.S. Pat. Nos. 3,680,708, 3,363,774, and 3,306,457, and depicted in FIG. 1, has been to utilize a filtrate compartment cover 2, one of which extends circumferentially from each of a plurality of axially extending filtrate dams 4, in a direction opposed to the direction of rotation of the drum, thereby defining narrow filtrate slots 6. A second such approach, exemplified by U.S. Pat. No. 3,794,178, and depicted in FIG. 2, has been to use a plurality of filtrate compartment covers 8 which extend in each circumferential direction to define narrow filtrate slots 9. U.S. Pat. No. 3,894,899 also discloses a system with relatively small slots into the filtrate compartments.

As a result of the filtrate compartment cover designs described above, these prior art proposals are somewhat effective in reducing the outward flow of filtrate from the filtrate compartment, thereby reducing rewetting. However, because of the substantial restriction on the free flow of liquid from the mat into the filtrate compartments, brought about by the reduced dimensions of the openings into the filtrate compartments, these prior art designs also tend to reduce the amount of liquid which is initially drained from the mat. The substantially closed construction of this type of design also retards the flow of filtrate along the filtrate compartments because of the increased surface friction. This tends to promote rather than retard rewetting.

Finally, in U.S. Pat. No. 4,370,231, which is assigned to the assignee of the present application, and which is incorporated herein by reference, a deck structure for a filtering apparatus including a rotatably mounted, generally cylindrical drum with filtering means and vacuum drainage means associated therewith. The deck structure includes a plurality of circumferentially spaced, axially extending, and radially projecting imperforate members affixed to the outer peripheral surface of the drum. The members each include a circumferentially extending surface which is radially spaced from the peripheral surface of the drum. The first surfaces define filtrate slots which are at least as wide in a circumferential direction as the first surfaces. A plurality of axially extending, evenly circumferentially spaced dams are mounted adjacent the outer periphery of no less than every second member (i.e., one dam for two or more members). The dams define filtrate compartments therebetween which lead to the vacuum drainage means within the drum. At least two subcompartments are defined by adjacent members within each filtrate compartment. Also included are perforate support means for supporting the filtering means above the filtrate compartments.

SUMMARY OF THE INVENTION

It is a primary object of the present invention to provide an improved deck construction for a rotary drum type filtering apparatus which effectively and reliably overcomes the aforementioned drawbacks and limitations of the prior art proposals. More specifically, the present invention has as its objects one or more of the following, taken individually or in combination:

(1) To develop an open filtrate deck design, thereby facilitating better drainage from the mat, which in turn results in better sheet formation;

(2) The provision of a deck construction which minimizes rewetting of the pulp mat and sheet roll-back;

(3) To provide an open filtrate deck design in which the velocity of filtrate from the mat and through the filtrate compartments is at a relatively lower flow, thereby promoting the formation of a looser sheet for improved displacement washing;

(4) The provision of a deck construction wherein the decking design eliminates the need for a backing wire allowing the facewire to be installed directly onto the deck;

(5) As opposed to prior art decks which are designed to rotate in either one of a clockwise or in a counterclockwise direction, the subject rotary drum filter can be rotated in both a clockwise and counterclockwise direction;

(6) To provide a deck design which has a broad "turndown" capacity and is able to accommodate production rates from about 0.25 to 2.50 ADTPD/sq. ft. of drainage area as compared with many prior art deck systems which are limited to production rates of about 0.75 to 0.80 ADTPD/sq. ft. of drainage area;

(7) To provide a deck design which is open for easy access for routine maintenance; and (8) To develop a deck system as described above which can be used on drum filters of the pipe, center valve, end drainage, suction box, pressure washer or valveless decker types.

This invention responds to the problems presented in the prior art by providing a deck structure for a filtering apparatus including a rotatably mounted, generally cylindrical drum with filtering means and vacuum drainage means associated therewith. The deck structure includes a plurality of circumferentially spaced, axially extending, and radially projecting imperforate members affixed to the outer peripheral surface of the drum. The members each include a circumferentially extending surface which is radially spaced from the peripheral surface of the drum. The first surfaces define filtrate slots which are not as wide in a circumferential direction as the first surfaces. Filtering means extend circumferentially about the cylindrical drum supported on the ends of the members. Each of the members define an axially extending retention channel which is adapted to receive the filtrate after the drum rotates past a twelve o'clock position, thereby minimizing rewetting of the fibrous mat which is formed on the filtering means.

The deck structure normally also includes radial flow means for directing at least a substantial portion of the filtrate to flow from the filtering means in a direct, radial direction into the filtrate compartments. This distinguishes the present invention from some of the prior art proposals, such as those depicted in FIGS. 1 and 2, wherein most of the filtrate must flow in one or more peripheral directions in order to enter the filtrate compartment; that is, only a small portion of the filtrate is permitted to flow in a direct, radial direction into the filtrate compartments. The structure of the present invention directs filtrate toward the filtrate compartments primarily radially rather than peripherally in a way which is superior to the prior art structures.

The invention may alternatively be defined as comprising a rotary drum type filtering apparatus adapted to be partially submerged in a tank filled with pulp slurry, with the apparatus including the following components: (1) a generally cylindrical, rotatably mounted drum; (2) a plurality of circumferentially spaced, axially extending, imperforate members mounted to the outer periphery of the drum to define a plurality of filtrate subcompartments, the members each including a first peripherally extending surface which is radially spaced from the drum, the first surfaces define filtrate slots therebetween; (3) perforate filtering means surrounding the drum disposed upwardly of the filtrate compartments for filtering the slurry as it enters the drum; and (4) suction drainage means for creating a suction within the drum to draw the filtrate through the filtering means and into the filtrate compartments to drain the filtrate therefrom.

More specifically, a deck structure for a filtering apparatus such as a rotary drum filter system is provided herein. The drum filter includes a rotatably mounted, generally cylindrical drum with filtering means and vacuum drainage means associated therewith. The deck structure comprises a plurality of circumferentially spaced, axially extending, and radially projecting imperforate members affixed at one end to the outer peripheral surface of the drum and having an outer end on which said filtering means is supported. The members each include a pair of circumferentially spaced, axially extending, and radially projecting imperforate surfaces. Perforate members are preferably formed in a substantially "U" shaped cross-sectional configuration comprising a pair of sidewall members connected to a floor member, which in turn is joined to and supported on the outer peripheral surface of the filter drum. The opposed surfaces of the members together define filtrate slots which form open axially extending channels adapted to receive at least a substantial portion of the filtrate after the drum rotates past the twelve o'clock position. In this way, rewetting of a fibrous mat formed on the filtering means is minimized. The ratio of the radially projecting height of the imperforate channel means to the width in the circumferential direction between opposed surfaces of adjacent members is at least about 1.25:1, preferably at least about 1.5:1, and more preferably at least about 2.0:1. In the deck structure of the present invention, the filtrate typically flows from the filtering means directly in an open radial flow path within said open axially extending channels.

Prior art drum filters having open deck structure are movable in only one rotational direction. In fact, all of the prior art drum filters depicted in FIGS. 1-4 will rotate only in clockwise direction as indicated by the directional arrow in each drawing. If a rotary drum filter in a manufacturing needs to be moved to another location, for example, its relocation will be limited by such monodirectional rotational capabilities. The deck structure of the is invention, on the other hand, is design to permit the drum to be rotated in both a clockwise and a counterclockwise direction.

The deck structure of the subject invention is designed to minimize rewetting of the pulp mat formed on the filtering means. Although many prior art drum filters employ deck structures which produce pulp mats having consistencies below 10%, pulp mats produced using the present deck structure have a consistency of at least about 10% by weight, preferably at least about 12% by weight, and more preferably at least about 14% by weight, based on the total weight of said pulp mat.

As previously stated, drum filters employing the subject deck design have a broad turndown capacity. The term "turndown capacity" means the ability of a deck structure to adapt to a broad fluctuations production rates. The deck structures of this invention can accommodate pulp mat production rates of from about 0.25 to 2.50, preferably from about 0.30 to 2.00, and more preferably from about 0.5 to 1.50 ADTPD/sq. ft. of drainage area.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 6 is an enlarged, fragmentary sectional elevation view of the member design incorporated into the embodiment of FIG. 5.

FIG. 7 is a fragmentary sectional view taken along line 7—7 of FIG. 5.

FIG. 8 is a schematic vertical sectional view taken along line 8—8 of FIG. 5.

DETAILED DESCRIPTION OF A PREFERRED EMBODIMENT

General Description of a Rotary Drum Filter

Figure 5:
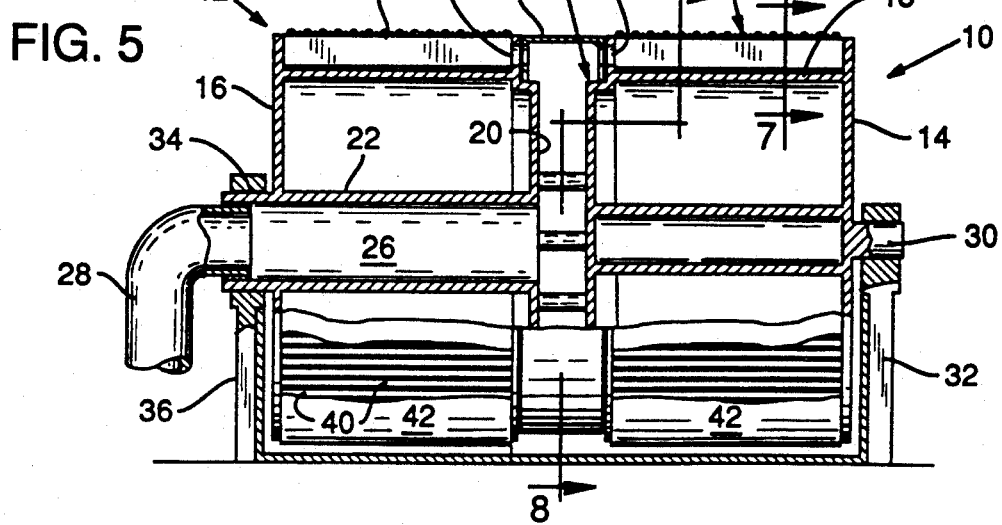
FIG. 5 is a front elevational view of a rotary drum filter of the center valve type having a deck design in accordance with the invention and with the surface portions of the drum broken away to show interior portions of the drum in section.

An exemplary rotary drum filter of the center valve type, one of several types of drum filters in which the present invention can be incorporated, is depicted in FIGS. 5 and 6 and is generally indicated with the numeral "10". However, as noted above, the present invention may also be utilized in drum filters of the pipe machine, end drainage, suction box, pressure washer or valveless decker types (not shown). The depicted rotary drum filter 10 includes a generally cylindrical drum 12 with flat opposite end walls 14 and 16 and generally cylindrical deck plate 18. A deck structure, indicated generally with the numeral 19, is disposed outwardly of, and is mounted to, deck plate 18. Inner end or head walls 20, together with an axially extending, cylindrical inner wall 22, defines an interior drum passage including a radial passage and an axial passage 26, the latter of which is connected to an external pipe 28. External pipe 28 is connected to a source of subatmospheric pressure (not shown). Drum 12 is rotatably mounted by a shaft 30 on a first support 32 at one end and by an external extension 34 of inner wall 22 on a second support 36 at the opposite end.

Embodiment of FIGS. 5-8

Figure 1:
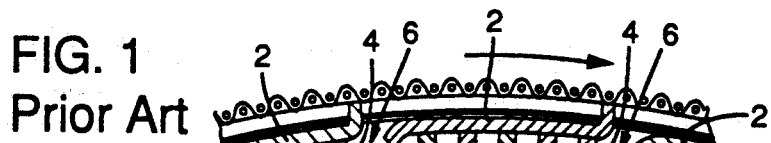
FIG. 1 depicts a prior art deck design, as described in U.S. Pat. No. 3,363,774.
Figure 2:
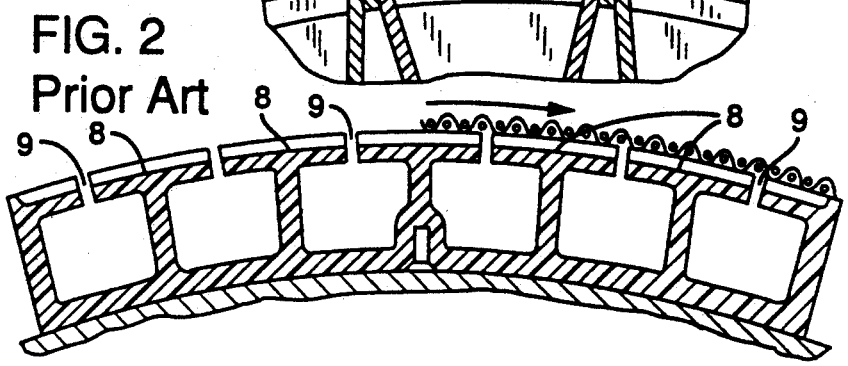
FIG. 2 depicts a prior art deck design, as described in U.S. Pat. No. 3,794,178.
Figure 3:
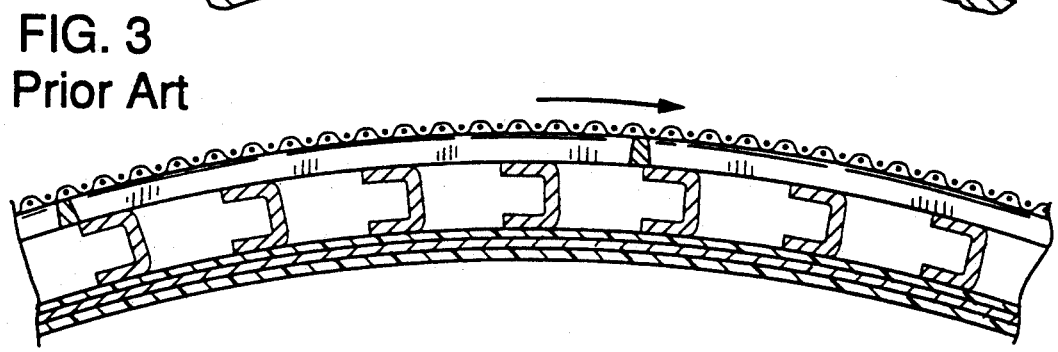
FIG. 3 depicts a prior art deck design, as described in U.S. Pat. No. 4,370,231.
Figure 4:
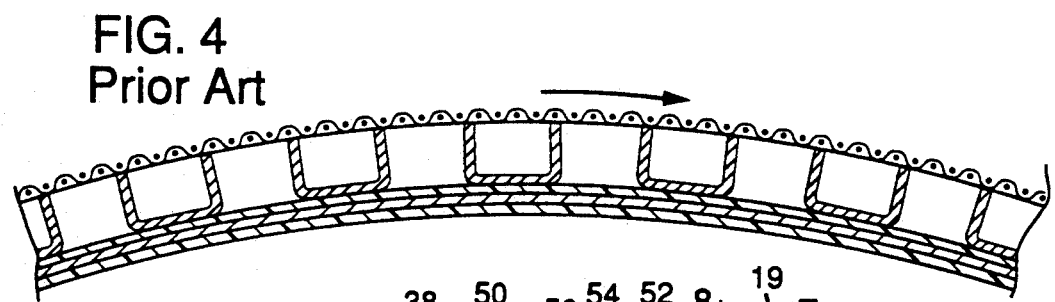
FIG. 4 depicts a prior art open grid design.

The deck structure 19 depicted in FIGS. 5-8 will now be described. Deck plate 18 supports a plurality of circumferentially space, axially extending, and radially projecting imperforate members 38. The term "members" is used in a broad sense to define a linearly extending support member, i.e., it is not necessarily intended to define a member which is generally "U" shaped in cross-section, and comprises a pair of sidewall members connected to a floor member, although such a design cross-section can be employed. For example, a plurality of flat bars can be employed as imperforate members 38. As shown best in FIG. 4, a plurality of parallel, axially spaced, circumferentially extending members 38 and joined to and supported on cylindrical deck plate to define drainage grooves therebetween. Members 38 extend around the entire periphery of drum 12 and thereby serve to support a filter screen 42 which also extends around the periphery of drum 12. Members 38 are typically constructed of a resilient material to accommodate for thermal expansion and contraction.

Pipe machine type filters typically include 18, 20, 24, 30 or 36 pipes. The number of filtrate compartments 46 should correspond to the number of drainage pipes so that one pipe is provided for each drainage compartment. With a center valve type filter, between thirty to fifty center valve ports are typically provided, with a single filtrate compartment 46 being provided for each such port. As seen best in FIG. 7, as previously described herein, the height "h" of channel 38 is at least about 1.25 times the circumferential width "w" of the filtrate compartments 46. This configuration minimizes rewetting and facilitates a high turndown capacity as previously described herein.

In the embodiment depicted in FIGS. 5-8, filtrate compartments 46 are opened at their axially outer ends at openings 50 and 52 to a central, circumferentially extending channel 54. Channel 54 receives a stationary arcuate valve member 56 which extends through a predetermined arc of channel 54 as shown in FIG. 5.

Operation of Embodiment of FIG. 5-8

Drum 12 is partially submerged in a tank 58 which typically contains a pulp slurry 60. As the drum rotates in a clockwise direction, as indicated by the arrow in FIG. 8, valve member 56 periodically blocks off each filtrate compartment 46 from communication with the subatmospheric pressure within drum passages 24 and 26 and external pipe 28, thereby permitting the removal of a pulp mat 62 from drum 12 using, for example, a roller 64 or a doctor blade (not shown).

Mat 62 is formed as follows: As drum 12 rotates into pulp slurry 60, a partial vacuum is applied to filtrate compartments 46, causing pulp fibers in the slurry to collect on the surface of filter screen 42. As filter screen 42 emerges from slurry 60, the vacuum continues to be applied, drawing filtrate liquid from mat 62 into filtrate compartments 46. The floors of filtrate compartment 46 formed by deck plate 18 cause the filtrate to flow readily from the open ends of the filtrate compartments into the channel and through radial passage 24 and axial passage 26. As each consecutive filtrate compartment becomes sealed off rom the continuously applied vacuum by stationary valve member 56, the drained pulp mat 62 can be removed from the surface of filter screen 42.

A more detailed description of the operation of drum filter 10 will now be provided with emphasis upon the performance of the novel deck structure 19 provided by the present invention. As clearly evident in FIG. 7, deck structure 19 is substantially open to the exterior of drum 12. It can be seen that the members 38 to promote free flow of filtrate through filter screen 42, generally radially through filtrate compartments 46, then axially along the subcompartments between members 38 to drainage openings 50 and 52, where the filtrate is conveyed through radial passage 24 to axial passage 26 and out of the drum through external pipe 28. The fact that there is no substantial change in direction in the flow of filtrate as it passes into filtrate compartments 46 ensures that the flow of filtrate will be moved without substantially rewetting the pulp mat. This promotes a preferred flow of filtrate through filter screen 42, both before and after the compartments emerge from pulp slurry 60. This permits multiple spraying operations on mat 62 after it has emerged from slurry 60 and provides for virtually complete drainage of mat 62 before it is removed from filter screen 42 by roller 64. With the mat 62 washed and drained of excess fluids, it is relatively easy to remove from filter screen 42 and is a relatively strong mat, thereby reducing the likelihood of tearing during removal. This relatively complete drainage will also simplify subsequent operations to be performed on the mat.

As noted above, rewetting has heretofore been a problem because, as the filtrate compartments pass the twelve o'clock position and before the mat is removed from the drum, liquid tends to flow by gravity outwardly back into the mat. Prior art designs have attempted to restrict the flow of filtrate back into the mat through the use of various flow-restricting members. However, the same members which restrict flow outwardly to prevent rewetting, also necessarily restrict the free flow of filtrate inwardly through the filter screen and deck drainage system during the other parts of the cycle. The present invention provides an open deck structure which promotes the free, generally radial flow of filtrate into the drum, yet inhibits rewetting of the mat through the use of the member 38 as described above. Thus, by the time filtrate compartments 46 passes the twelve o'clock position, very little liquid will be retained in the pulp mat 62. This is a direct result of the open design of deck structure 19 which provides a minimum of surface area above deck plate 18. Once gravity begins to act on any remaining filtrate in filtrate compartments 46, this filtrate merely collects in lower position thereof. Thus, very little, if any, liquid can flow outwardly to rewet the mat 62.

Having described and illustrated the principles of the invention in a preferred embodiment thereof, it should be apparent that the invention can be modified in arrangement and detail without departing from such principles. I claim all modifications and variation coming within the spirit and scope of the following claims.

I claim:

1. A rotary drum filter apparatus comprising a deck structure for a rotary drum filter and said rotary drum filter including a generally cylindrical drum rotatably mounted in a tank, said drum filter including filtering means and vacuum drainage means associated therewith, along with means for rotating said drum said rotary drum filter being of the pipe, center valve, end drainage, suction box, pressure washer or valveless decker types for producing a fibrous mat, wherein said deck structure includes a plurality of circumferentially spaced, axially extending, and radially projecting imperforate members affixed at one end to the outer peripheral surface of the cylindrical drum and having an outer end on which said filtering means is supported, said radially projecting imperforate members each having a substantially uniform height throughout its entire length and, including a pair of radially projecting imperforate surfaces, the opposed surfaces of adjacent one of said radially projecting imperforate members together defining filtrate slots each of which forms an open axially extending channel having a substantially uniform height and width throughout its entire length and; for receiving at least a substantial portion of the filtrate after the drum rotates past the twelve o'clock position thereby minimizing rewetting of said fibrous mat which is formed on the filtering means, the ratio of the radially projecting height of each channel to the width in the circumferential direction between opposed surfaces of adjacent members defining said channel is at least about 2.0:1.

2. The apparatus of claim 1, wherein said means for rotating said drum includes means to, rotate said drum is mounted for rotation in either a clockwise or counter-clockwise direction.

3. The apparatus of claim 1, wherein adjacent pairs of said members form a substantially "U" shaped cross-sectional configuration.

4. A rotary drum filtering apparatus adapted to be partially submerged in a tank filled with pulp slurry, wherein the apparatus comprises:
- a drum filter having a generally cylindrical drum rotatably mounted in said tank and said rotary drum filter being of the pipe, center valve, end drainage, suction box, pressure washer or valveless decker types for producing a fibrous mat;
- means for rotating said cylindrical drum and said drum filter further including filtering means supported by said drum a deck structure which includes a plurality of circumferentially spaced, axially extending, and radially projecting imperforate members affixed at one end to the outer peripheral surface of the drum and having an outer end on which said filtering means is supported, said members each having a substantially uniform height throughout its entire length and, including a pair of radially projecting imperforate surfaces, the opposed surfaces of adjacent ones of said members together defining filtrate slots each of which forms an open axially extending channel having a substantially uniform height and width throughout its entire length and adapted to receive at least a substantial portion of the filtrate after the drum rotates past the twelve o'clock position thereby minimizing rewetting of the fibrous mat formed on the filtering means, the ratio of the radially projecting height of each channel to the width in the circumferential direction between opposed surfaces of adjacent members which define said channel is at least about 2.0:1,
- said filtering means being perforated and surrounding said drum and being disposed ratio outwardly of said channels for filtering the slurry as it enters said drum;
- means for rotating said rotatably mounted drum; and
- suction drainage means for creating a suction within said drum to draw the filtrate through said filtering means and into said channels, and to drain the filtrate therefrom.

5. The apparatus of claim 4, wherein the means for rotating said drum comprises means to rotate the drum. in either a clockwise or counterclockwise direction.

6. The apparatus of claim 4, wherein a plurality of adjacent pairs of said members form a substantially "U" shaped cross-sectional configuration.

7. A rotary drum filter apparatus for filtering a pulp slurry and creating a pulp mat thereon comprising a deck structure for a rotary drum filter and a rotary drum filter including a generally cylindrical drum rotatably mounted in a tank, said drum filter further including, filtering means and vacuum drainage means associated therewith along with means to rotate said drum, said rotary drum filter being of the pipe, center valve, end drainage, suction box, pressure washer or valveless decker types for producing a pulp mat from a pulp slurry, wherein said deck structure includes a plurality of circumferentially spaced, axially extending, and radially projecting imperforate members having a substantially constant radially extending height throughout their entire length, affixed at one end to the outer peripheral surface of the cylindrical drum and having a radially outer end on which said filtering means is supported, said radially projecting imperforate members each including a pair of radially projecting imperforate surfaces, the opposed surfaces of adjacent ones of said radially projecting imperforate members together defining filtrate slots each of which forms an open axially extending channel having a substantially uniform height and width throughout its entire length and for receiving at least a substantial portion of the filtrate from the pulp slurry after the drum rotates past the twelve o'clock position thereby minimizing rewetting of said pulp mat formed on the filtering means, the ratio of the total radially projecting height of the channel to the width in the circumferential direction between opposed surfaces of adjacent members defining said channel is at least about 2.0:1.

8. The apparatus of claim 7, wherein said means to rotate said drum comprises means to rotate said drum in either a clockwise or counterclockwise direction.

9. The apparatus of claim 7, wherein a plurality of adjacent ones of said members form a substantially "U" shaped cross-sectional configuration.

* * * * *